United States Patent [19]

Miller

[11] Patent Number: 4,881,172
[45] Date of Patent: Nov. 14, 1989

[54] OBSERVER CONTROL MEANS FOR SUSPENSION SYSTEMS OR THE LIKE

[75] Inventor: Lane R. Miller, Cary, N.C.
[73] Assignee: Lord Corporation, Erie, Pa.
[21] Appl. No.: 945,380
[22] Filed: Dec. 22, 1986
[51] Int. Cl.$^4$ .............................................. B60G 17/00
[52] U.S. Cl. .................................. 364/424.05; 280/707
[58] Field of Search ............... 364/148, 149, 150, 151, 364/424.05, 425; 280/707

[56] References Cited

U.S. PATENT DOCUMENTS

| | | | |
|---|---|---|---|
| 3,807,678 | 4/1974 | Karnopp et al. | 248/358 R |
| 3,920,965 | 11/1975 | Sohrwardy | 235/150.1 |
| 3,995,883 | 12/1976 | Glaze | 280/707 |
| 4,054,780 | 10/1977 | Bartley et al. | 364/150 |
| 4,195,337 | 3/1980 | Bertrand et al. | 364/151 |
| 4,213,175 | 7/1980 | Kurihara | 364/119 |
| 4,368,509 | 1/1983 | Li | 364/148 |
| 4,468,050 | 8/1984 | Woods et al. | 280/707 |
| 4,468,739 | 8/1984 | Woods et al. | 364/424 |
| 4,491,207 | 1/1985 | Boonchanta et al. | 188/299 |
| 4,502,109 | 2/1985 | Delmege et al. | 364/174 |
| 4,581,699 | 4/1986 | Delmege et al. | 364/174 |
| 4,591,186 | 5/1986 | Ashiba | 280/707 |
| 4,602,326 | 7/1986 | Kraus | 364/148 X |
| 4,639,853 | 1/1987 | Rake et al. | 364/149 |
| 4,650,042 | 3/1987 | Krecht et al. | 280/707 X |
| 4,671,533 | 6/1987 | Asami et al. | 280/707 |
| 4,693,485 | 9/1987 | Kamei et al. | 280/DIG. 1 X |
| 4,696,489 | 9/1987 | Fujishiro et al. | 280/707 |

Primary Examiner—Gary Chin
Attorney, Agent, or Firm—Bell, Seltzer, Park & Gibson

[57] ABSTRACT

The apparatus is particularly suited for control of the performance of a vehicle suspension system or similar plant having controllable semiactive dampers capable of either high or low damping modes. Different plant modes ensue from different combinations of the damper modes. The control apparatus includes observer devices that model each of the plant modes and produce estimates of the plant output or performance that would be produced in each plant mode. A cost function device identifies the optimal one of the estimates, and the dampers in the real plant are adjusted so as to cause the plant to assume the one of its modes modeled by the observer producing the optimal estimate. In an alternative reduced form of the invention, the functions of the observer and cost function devices are performed by switching function generators that produce switching functions indicative of the estimated worth of the outputs that would be produced by the plant in each of its different modes.

23 Claims, 6 Drawing Sheets

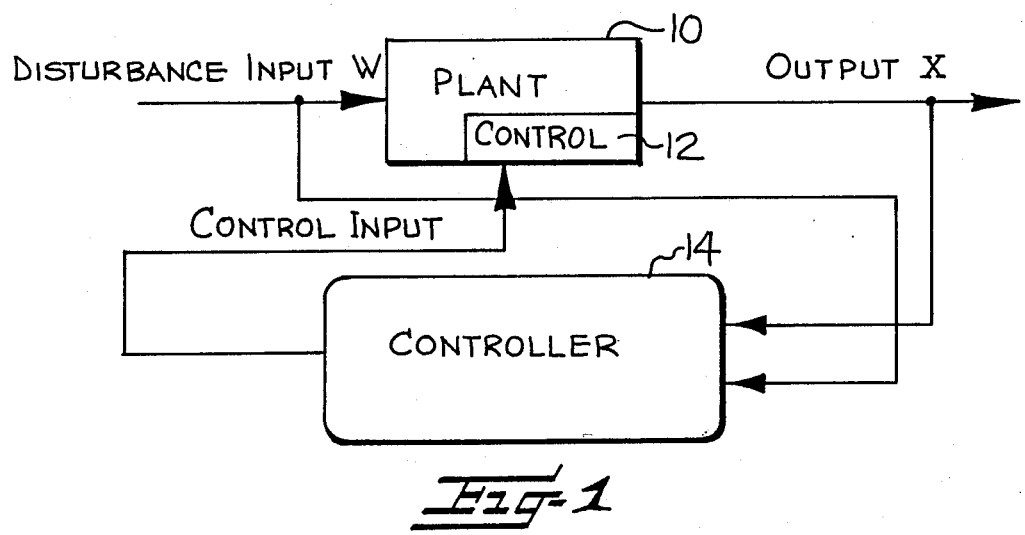
Fig-1
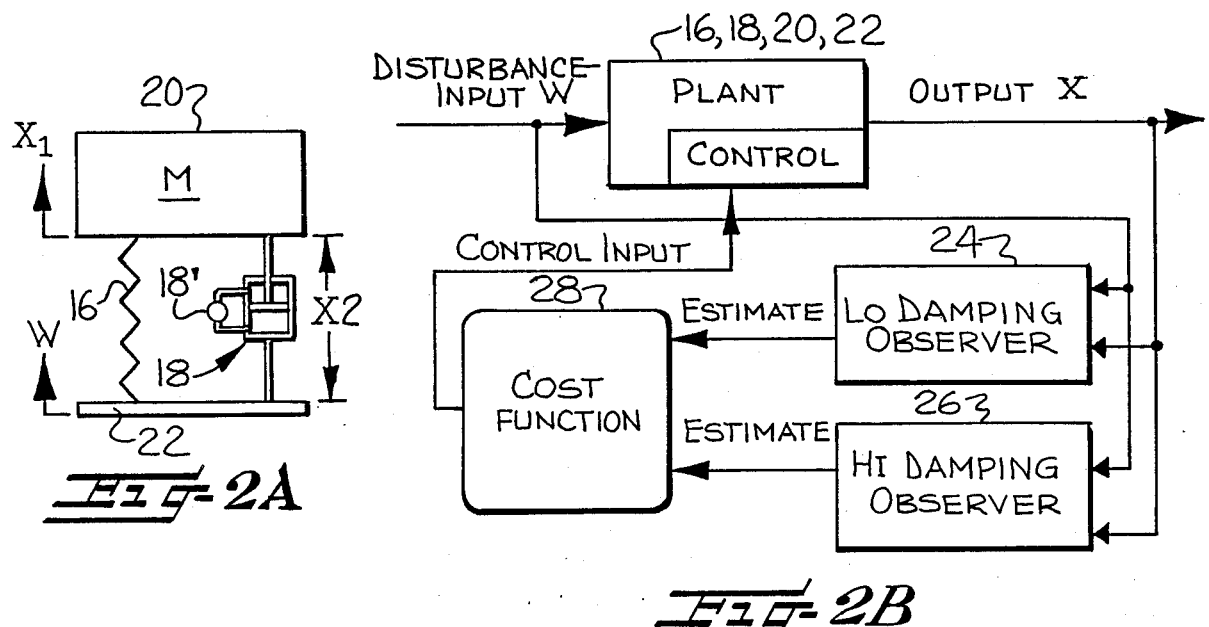
Fig-2A
Fig-2B

Table for Switching Parameters

| Case j | $c_1$ | $c_2$ | $a_j$ | $b_j$ | $c_j$ | $d_j$ |
|---|---|---|---|---|---|---|
| Case 1 | HI | HI | $a_1 = -\dfrac{C_1 HI}{M}$ | $b_1 = -\dfrac{C_2 HI}{M}$ | $c_1 = -\dfrac{L_1}{1} C_1 HI$ | $d_1 = -\dfrac{L_2}{1} C_2 HI$ |
| Case 2 | HI | LO | $a_2 = -\dfrac{C_1 HI}{M}$ | $b_2 = -\dfrac{C_2 LO}{M}$ | $c_2 = -\dfrac{L_1}{1} C_1 HI$ | $d_2 = -\dfrac{L_2}{1} C_2 LO$ |
| Case 3 | LO | HI | $a_3 = -\dfrac{C_1 LO}{M}$ | $b_3 = -\dfrac{C_2 HI}{M}$ | $c_3 = -\dfrac{L_1}{1} C_1 LO$ | $d_3 = -\dfrac{L_2}{1} C_2 HI$ |
| Case 4 | LO | LO | $a_4 = -\dfrac{C_1 LO}{M}$ | $b_4 = -\dfrac{C_2 LO}{M}$ | $c_4 = -\dfrac{L_1}{1} C_1 LO$ | $d_4 = -\dfrac{L_2}{1} C_2 LO$ |

Fig-9

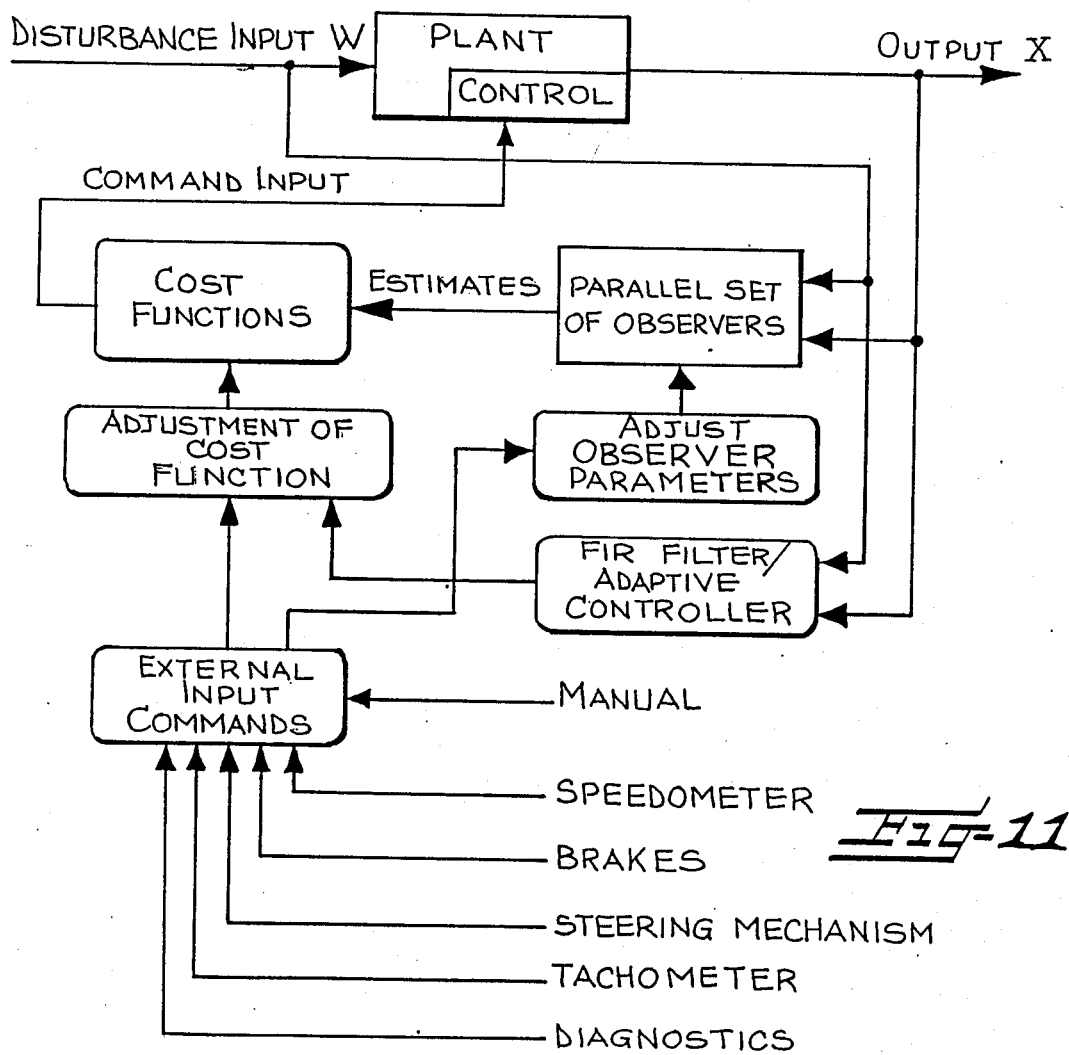

Fig-11

OBSERVER CONTROL MEANS FOR SUSPENSION SYSTEMS OR THE LIKE

This invention relates to control means employing mathematical models, commonly referred to as estimators or observers, for producing real time estimates of the output of the controlled plants or systems. The invention more specifically relates to an improved observer control means that is particularly, but not necessarily exclusively, adapted for control of the operation or performance of a vehicular suspension system or similar plant having dampers of the semiactive type.

BACKGROUND OF THE INVENTION

Vehicular and other suspension systems customarily include suspension units each comprised of a spring and a parallel damper or shock absorber that interconnect relatively movable vehicle components such as the vehicle body and frame. The damper normally is a passive one which is not connected to a pump or other high pressure source of hydraulic fluid and which generates damping forces only in response to, and in opposition to, relative movement between the interconnected vehicle components. A recognized deficiency of a passive damper is that under certain conditions of relative movement of the interconnected vehicle components, the damper will amplify rather than attenuate motion of the component that is to be isolated from shocks, vibrations and similar disturbance inputs.

The foregoing undesirable characteristic of passive dampers is not shared by fully active dampers. These employ hydraulic pumps, or other sources of pressurized hydraulic fluid, and associated control components by which the magnitude and direction of the forces generated by the dampers may be so regulated as to always effect the desired motion attenuation irrespective of the condition of relative movement between the interconnected vehicle components. Due to their inclusion of a hydraulic pump or similar pressurized fluid source, however, systems utilizing fully active dampers are relatively heavy and bulky, and are expensive from the viewpoint of both their acquisition and operating costs.

Although less conventional, dampers of the so-called "semiactive" type are also known. A semiactive damper, in keeping with a purely passive one, is not connected to a hydraulic pump or other source of pressurized fluid, and can only generate damping forces in response to and in opposition to relative movement between the vehicle components interconnected by it. Unlike a passive damper, however, a semiactive damper has control means for rapidly varying in a controlled manner the damping coefficient of the damper. This permits the damping forces generated by the damper to be of different magnitude at desired times. A simple form of a semiactive damper consists of a hydraulic piston-and-cylinder assembly having adjustable valve means within a passageway interconnecting opposite end portions of the cylinder of the assembly. The valve means throttles, to a greater or lesser extent, the fluid flow induced within such passageway by extension and retraction of the assembly as a result of relative movement between the vehicle components interconnected by it. When the relative motion condition between the vehicle components and across the damper is such that damping forces would attenuate undesired motion of the vehicle component whose motion is to be minimized, the valve means is caused to restrict or throttle the fluid flow. This increases the damping coefficient of the damper and results in the generation of damping forces of significant magnitude. On the other hand, when the relative motion condition across the damper is such that the generation of damping forces would amplify rather than attenuate motion of the vehicle component, the valve is fully opened so as to reduce the damping coefficient and cause the damping forces to be of reduced (ideally zero) magnitude. Although a semiactive damper cannot fully achieve the same degree of performance as an active damper, it can when properly controlled closely approach such performance for considerably less cost.

In the case of a vehicle suspension or other system having a semiactive damper and only a single degree of freedom, good performance can be realized when the control valve of the damper is adjusted in accordance with a relatively simple control policy such as disclosed in U.S. Pat. Nos. 3,807,678 and 4,491,207. However, many vehicle suspension and other systems are complicated high order, nonlinear systems having multiple degrees of freedom and a plurality of dampers. Such systems are customarily subjected to a variety of forces and effects of the "disturbance" type that cannot be directly modulated or controlled. For example, the suspension system of an automobile or similar vehicle is subjected to disturbance inputs produced by irregularities in the road surface over which the vehicle travels, by windage, by operation of the vehicle's engine or its powered accessories, and by the response of various of the vehicle's components to inertia forces occurring during acceleration, deceleration, cornering, etc. Optimal performance of a complex system of the foregoing type cannot be achieved readily, if at all, by simple control policies successfully employable for semiactive damper control in less complex systems.

Systems employing fully active (as opposed to only semiactive) dampers have heretofore been controlled by feedback control means that monitor one or more system parameters to determine actual system performance, which is then compared with a predetermined performance standard. The difference between the actual system performance and the predetermined standard is used to modulate the force input to, and therefore the force output of, the active dampers in a manner tending to eliminate the aforesaid difference. The use of similar control techniques in association with a complex suspension system utilizing semiactive dampers, instead of active ones, is much less likely to result in optimal system performance. This is due at least in part to the absence in a semiactive system of a hydraulic pump or other source of pressurized hydraulic fluid which can introduce forces of substantially any desired magnitude and/or direction into the system at each of the dampers independently of the then existing conditions of relative movement across the dampers. The inability of semiactive dampers to generate damping forces except in response to and in opposition to relative movement thereacross significantly increases the difficulty of achieving optimum system control by ordinary feed-back control techniques.

A more recently developed type of plant control means uses an estimator or "observer" to model the controlled system or plant. However, in most if not all instances the observer is used only for a limited purpose, such as estimation of system inputs or outputs not readily capable of direct measurement, and not for overall system management.

SUMMARY OF THE INVENTION

With the foregoing in mind, the present invention provides an improved control method and means for achieving optimal operation of a vehicle or similar suspension system or plant having at least one and customarily a plurality of semiactive dampers each capable of assuming at least two distinct operating configurations or modes. In one mode each damper has a relatively high damping coefficient and generates damper forces of significant magnitude in response to relative movement across it. In another mode the damping coefficient and the forces generated by the damper are caused to be of minimal (ideally zero) magnitude. Changes in the mode of each damper are effected by actuation of control means which may and usually will be in the form of a flow valve associated with the damper. Changes in the damper modes change the operating configuration or mode of the overall suspension system or plant. The number of different operating configurations or modes of the suspension system of which the dampers form a part is an exponential function of the number of the dampers and the number of their possible modes. All of these possible operating modes of the system or plant are modeled by respective ones of a corresponding number of plant modeling observers. These each receive monitored data relating to the operation of the system or plant and each provide an estimate of the plant or system "output" or performance that would result from operation of the system in the particular modeled mode thereof. A cost function means compares the observer estimates and identifies an optimum one of them and the particular modeled system mode providing such estimate. The modes of the dampers in the real system are then caused to correspond to the damper modes in the system model producing the optimum estimate.

In an alternative reduced form, the functions of the observers and the cost function means are performed by switching function means that produces switching functions indicative of the value of the outputs that would be produced by the system or plant in each of its different modes.

DESCRIPTION OF THE PRIOR ART

Suspension or similar systems utilizing semiactive dampers are disclosed in U.S. Pat. Nos. 3,807,678, 4,468,050, 4,468,739 and 4,491,207.

U.S. Pat. Nos. 4,502,109 and 4,581,699 disclose control apparatus for a hydraulic servo actuator or similar fully active device. The control apparatus includes an observer for providing an estimate of the acceleration, velocity and/or displacement of the actuator.

U.S. Pat. No. 4,368,509 relates to a method and means for optimizing operation of a machine. A digital computer records and statistically analyzes data produced by fractional factorial experimental or other operation of the machine in various possible modes thereof, determines the functional relationship between system variables and system performance, and then employs such information to select and place the system in a particular mode.

U.S. Pat. No. 4,213,175 discloses a fault-detecting control system using a plurality of observers and comparators, and a decision-making or judging section.

U.S. Pat. No. 3,920,905 discloses a predictive control system having a single fast-time model of the controlled system. The model predicts the outputs that would be produced by the controlled system in response to different selectable (versus disturbance) inputs that cause forces to be actively generated and applied to system. The model predicted outputs are compared to determine an optimum one, and the real system receives an input corresponding to that which produced the optimum estimated output from the model.

DESCRIPTION OF THE DRAWINGS

FIG. 1 is a block diagram of an apparatus according to the present invention where the real system or plant inputs and output are measured to provide a signal to the plant controller.

FIGS. 2A and 2B respectively are a schematic representation and a block diagram of a single degree of freedom suspension system and of apparatus for controlling operation of the system in accordance with the present invention.

FIG. 9 is a table of switching parameters usable in a control apparatus of the present invention for the motorcycle suspension system of FIG. 8.

FIG. 11 is a block diagram illustrating additional controls and external commands available for the control apparatus of the present invention.

DESCRIPTION OF THE PREFERRED EMBODIMENTS

Figure 3:
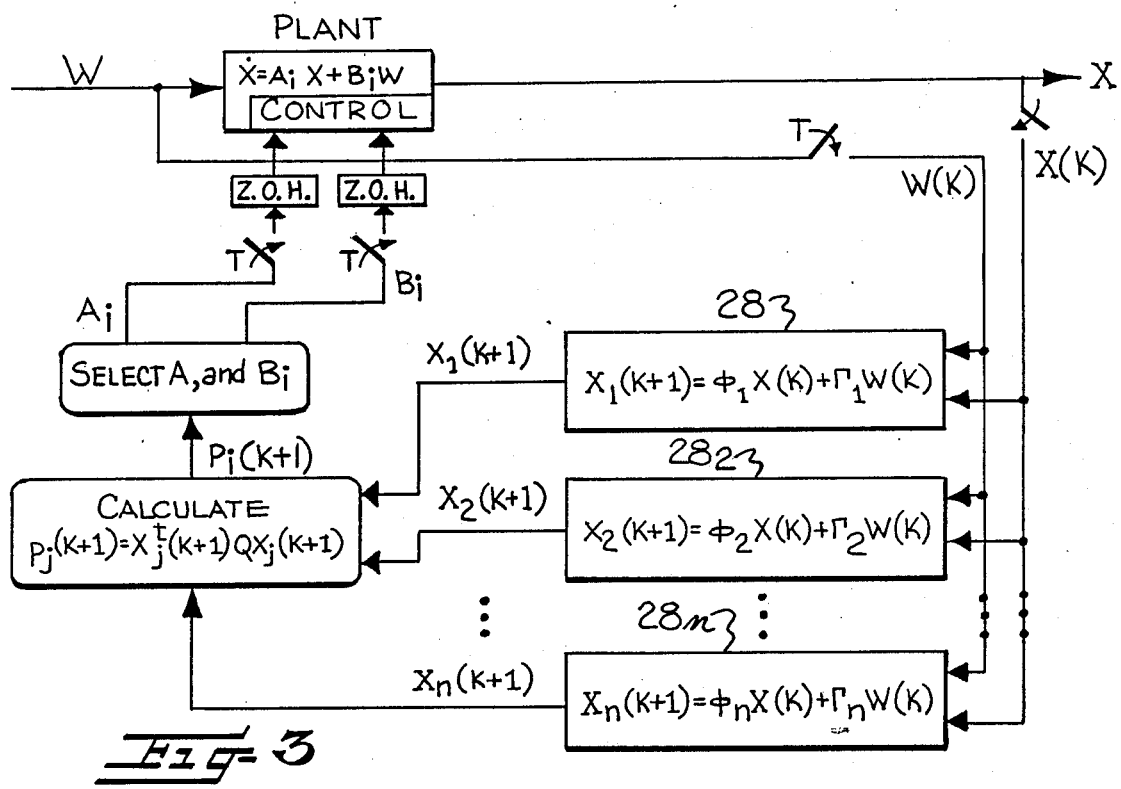
FIG. 3 is a block diagram of an apparatus according to the present invention wherein the disturbance input to the plant and the plant output are measured to provide a signal to the plant control means.

FIG. 1 is a block diagram illustrating control apparatus of the present invention in association with a plant 10 such as a vehicle suspension system. When plant 10 is such a system, the input to it includes and may consist entirely of disturbance inputs. These might and normally would be internal engine forces, aerodynamic forces, ground or roadway disturbances, and inertia forces, as well as possibly other forces. The output of the plant includes relative displacements between components in the plant and velocities of components in the plant. The output contains parameters that collectively describe the operation or performance of the plant as well as describing specific motions of at least some plant components. The control means 12 within the plant is used to optimize plant performance. The criteria used to determine optimum performance need not always be the same at all times during plant operation. For example, optimum plant performance may at times consist of minimization of the relative displacements between certain of the plant components, and at other times of minimization of the velocities of plant components. The control means 12 may take the form of one or more semiactive dampers having valves or other means for rapidly varying the damping coefficient, and thus the functional operating configuration or mode, of each damper during plant operation. Changes in the overall plant functional configuration or mode ensue from mode changes of the damper means. The controller 14 monitors at least some parameters of the plant disturbance input and/or plant output, determines which mode of the plant will produce optimal operation thereof, and provides a control input to the damper control valve means. The control input causes the plant to assume a mode in which optimum plant performance is realized or approached as closely as possible.

Referring now to FIGS. 2A and 2B, FIG. 2A is a schematic representation of a single degree of freedom suspension system consisting of a spring 16 and a parallel semiactive damper 18 that support a mass 20 above a base 22. Mass 20 and base 22 may be the body and frame components of a motor vehicle. W represents the motion of base 22, which is a disturbance input into the illustrated suspension system. $X_1$ represents the velocity of mass 20, and $X_2$ represents the relative displacement between base 22 and mass 20, or the deflection of spring 16. Rapidly adjustable control valve means 18′ associated with damper 18 permits placement of the damper in either desired one of at least two different operating conditions or modes. In the first mode of damper 18, control valve 18′ significantly restricts flow of fluid between opposite ends of the damper and thus causes its damping coefficient to be high. In the second mode of damper 18 the control valve 18′ is more fully open and the damping coefficient is reduced, preferably to a minimum (ideally zero) magnitude. The "plant" shown in the block diagram of FIG. 2B consists of the elements shown in FIG. 2A, as is indicated by the use of corresponding reference numerals. The plant output X of FIG. 2B is comprised of the mass velocity and relative displacement components $X_1$ and $X_2$. The FIG. 2B control apparatus includes observer means comprised of two parallel observers 24, 26 that simultaneously receive monitored data relative to the plant disturbance input W and output X. The number of observers is equal to the number of different possible plant modes, which in turn is a function of the number of semiactive dampers 18 in the plant and the number of possible modes of each such damper. More specifically, if a plant has N semiactive dampers each capable of assuming M modes, the number of observers is $M^N$, or $2^1$ in the FIG. 2B illustrative case. Each observer 24, 26 models a different one of the possible modes of the plant and responds to the plant disturbance input and output data received by it, at a particular sampled time interval, by providing an estimate of what the plant output would be at a succeeding time interval if the actual plant mode were that modeled by the observer. More specifically in the case of the FIG. 2B apparatus, the observer 24 provides an estimate of what the plant output would be if damper 18 were in its low damping mode, and observer 26 provides an estimate of what the plant output would be if damper 18 were in its high damping mode.

The estimate output signals from the observers 24, 26 are the input signals to a cost function means 28. The cost function, sometimes referred to as a weighting function or penalty function, compares the estimate signals produced by the observers 24, 26 and identifies the optimum one of the estimates. For example, if the velocity $X_1$ of the mass 20 is to be minimized, the cost function would have a form that gives priority to minimizing the velocity of the mass at the expense of ignoring or according less significance to other plant output variables, such as the relative displacement $X_2$ between mass 20 and base 22. If the cost function means 28 determines that the estimate produced by the "lo damping" observer 24 is more favorable or optimal than that produced by the observer 26, the control input directed to damper 18 causes opening of damper valve 18′ and reduction of the damping coefficient of the damper. Similarly, if the estimate of the "hi damping" observer 26 is more optimal than that of observer 24, the control input directed to damper valve 18′ causes the latter to significantly restrict fluid flow and thus increase the damping coefficient of the damper.

Dynamic systems can be modeled in the form of linear differential equation (1) and output equation (2).

$$\dot{X} = AX + BW \tag{1}$$

$$Y = CX \tag{2}$$

X is a vector containing the output states. $\dot{X}$ is the time derivative of X. In vehicle suspension systems, the states typically are velocities of masses and deflections of springs. A is the plant or system matrix. B is the disturbance input matrix. C is the plant output matrix. A, B and C are constant matrices which are functions of the system damping coefficients, spring rates and masses. W s a vector of the input disturbances. In vehicle suspension systems, these disturbances typically can be input velocities from a rough road surface, inertial forces from braking, cornering and the like, and engine forces. Vector Y is the output vector. In many cases, Y is a subset of X.

A microprocessor cannot use state equations in the form of equation (1). A microprocessor must use difference equations rather than differential equations. Difference equations involve additions, subtractions and multiplications. Differential equations can be transformed into difference equations. The simplest type of transformation is Euler integration. With this method, each state is integrated using a rectangular approximation over each sampling interval T. Other types of transformations include using the bilinear transform and the exponential matrix.

Since systems using semiactive dampers can be described by piecewise linear state equations, a distinct system matrix $A_i$ and input matrix $B_i$ can be defined where i varies between 1 and n, with n being the total number of plant observers. Each $A_i$ and $B_i$ pair corresponds to a particular configuration or mode in which the valves of the active dampers in the system are set in a given position. A difference equation can be written in the form of equation (3) which represents an observer.

$$X(k+1) = \phi_i X(k) + \Gamma_i W(k) \tag{3}$$

In this equation, X(k) and W(k) are the current actual output state and disturbance input vectors sampled at interval k. X(k+1) is the predicted value of the state of the next sampling interval. The duration of the sampling interval T is selected to be extremely small, such as two milliseconds, when compared to the bandwidth of the inputs and the bandwidth of the system. The selection of T must obey the Nyquist sampling theorem. $\phi_i$ is the discrete system matrix which is often called the state transition matrix. $\Gamma_i$ is the discrete input matrix. Using Euler integration, $\phi_i$ and $\Gamma_i$ can be described by equations (4) and (5).

$$\phi_i = 1 + A_i T \qquad (4)$$

$$\Gamma_i = B_i T \qquad (5)$$

A generalized cost function can be written as equation (6).

$$p(k+1) = X^t(k+1) Q X(k+1) \qquad (6)$$

The superscript t designates a matrix transpose operation. This cost function is calculated in terms of the predicted state $X(k+1)$ from the observer. Weighting matrix Q is used to select which states require more minimization, such as mass velocity or spring deflection.

A general form of an apparatus for observer control of a semiactive system or plant is shown in FIG. 3. In this apparatus, all of the input disturbances W(k) and all of the plant output states X(k) are measured. A digital controller is used, and sampling is done at intervals of T seconds. The measured disturbance input W(k) and the measured output X(k) are used as inputs for a parallel combination of observers $28_1, 28_2 \ldots 28_n$ to produce a set of predicted states $X_j(k+1)$ where j is an integer from 1 to n. These observers have the form of equation (7).

$$X_j(k+1) = \phi_j X(k) + \Gamma_j W(k) \qquad (7)$$

Each observer represents a distinct configuration or mode of having the valves in the active dampers set for high or low damping. As shown schematically in FIG. 3, cost functions $p_j(k+1)$ can be calculated based on each $X_j(k+1)$ through equation (8).

$$p_j(k+1) = X_j^t(k+1) Q X_j(k+1) \qquad (8)$$

After all of the cost functions $p_j(k+1)$ are calculated, an optimum, and usually minimum, cost function $p_i(k+1)$ can be identified. This optimum cost function is used to select a corresponding $A_i$ and $B_i$ pair which corresponds to a specific valve configuration. Therefore, the $A_i$ and $B_i$ matrices are inputs into the control for the real plant or system. These inputs will be held between sampling intervals by a zero order hold mechanism Z.O.H.

Figure 4:
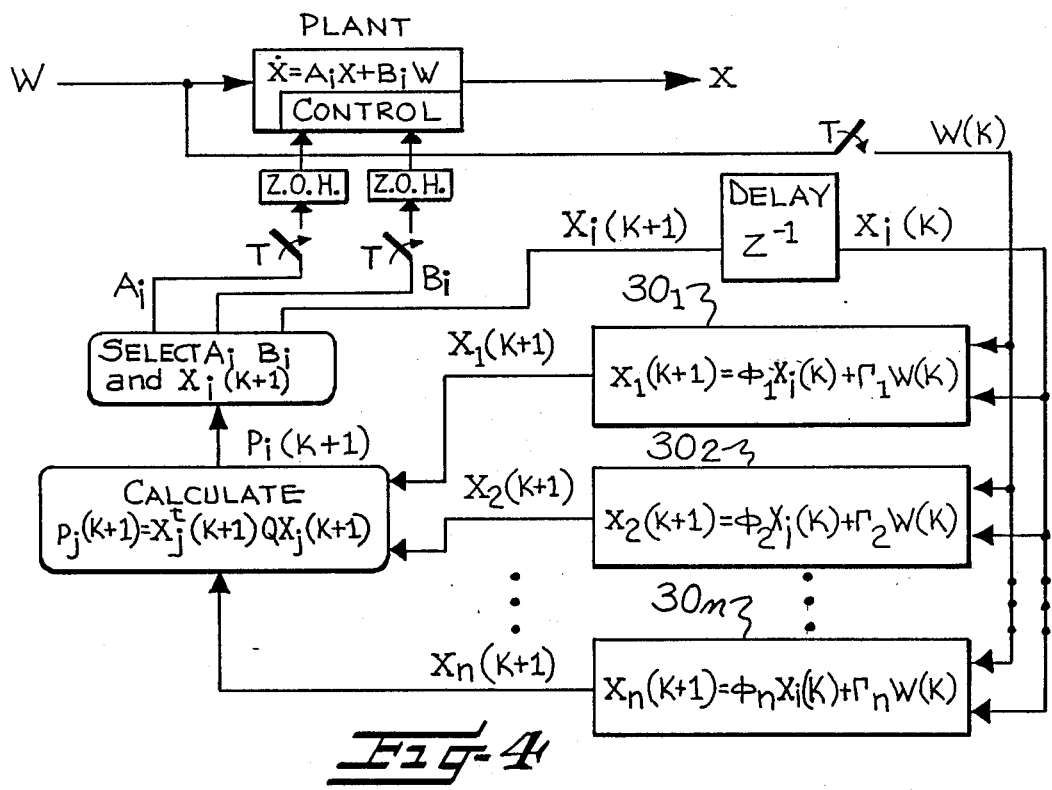
FIG. 4 is a block diagram of an apparatus in accordance with the present invention where only disturbance input to the plant is measured.

FIG. 4 illustrates how semiactive observer control is implemented without measuring any of the plant output states X. This method relies on having exact models or observers $30_1, 30_2 \ldots 30_n$ of the plant configurations or modes, and the initial plant output state. The disturbance input W is sampled at time intervals T producing sampled inputs W(k). Without measuring any of the output states, the observer takes the form of equation (9), which is slightly different than the observer form of equation (7).

$$X_j(k+1) = \phi_j X_i(k) + \Gamma_j W(k) \qquad (9)$$

In this case, the output state vector on the right hand side of the equation is $X_i(k)$ which is the delayed value of the selected estimate $X_i(k+1)$. In FIG. 4, $Z^{-1}$ represents a delay of T seconds. $X_i(k+1)$ is the predicted output state which produces the minimum cost function $p_i(k+1)$. Using the estimated output state $X_i(k)$ and a measurement of the disturbance input W(k), predicted output states $X_j(k+1)$ can be calculated. Once again, the predicted output state $X_j(k+1)$ is used to produce corresponding cost functions $p_j(k+1)$. Based on the minimum cost function $p_i(k+1)$, the desired system configuration, i.e., control settings, can be selected through $A_i$ and $B_i$. At this point, $X_i(k+1)$, which corresponds to $A_i$ and $B_i$, is selected from the set of $X_j(k+1)$.

The control system of FIG. 4 is not as desirable as some others because it does not measure any of the plant states or plant outputs. Therefore, exact knowledge of the initial states and exact knowledge of how to construct the observers is essential. The control system of FIG. 3 is also not as desirable as some others because it requires measuring all of the output states, which may be impractical. By way of illustration, a simple vehicle suspension system would typically require the feedback of twelve states.

Figure 5:
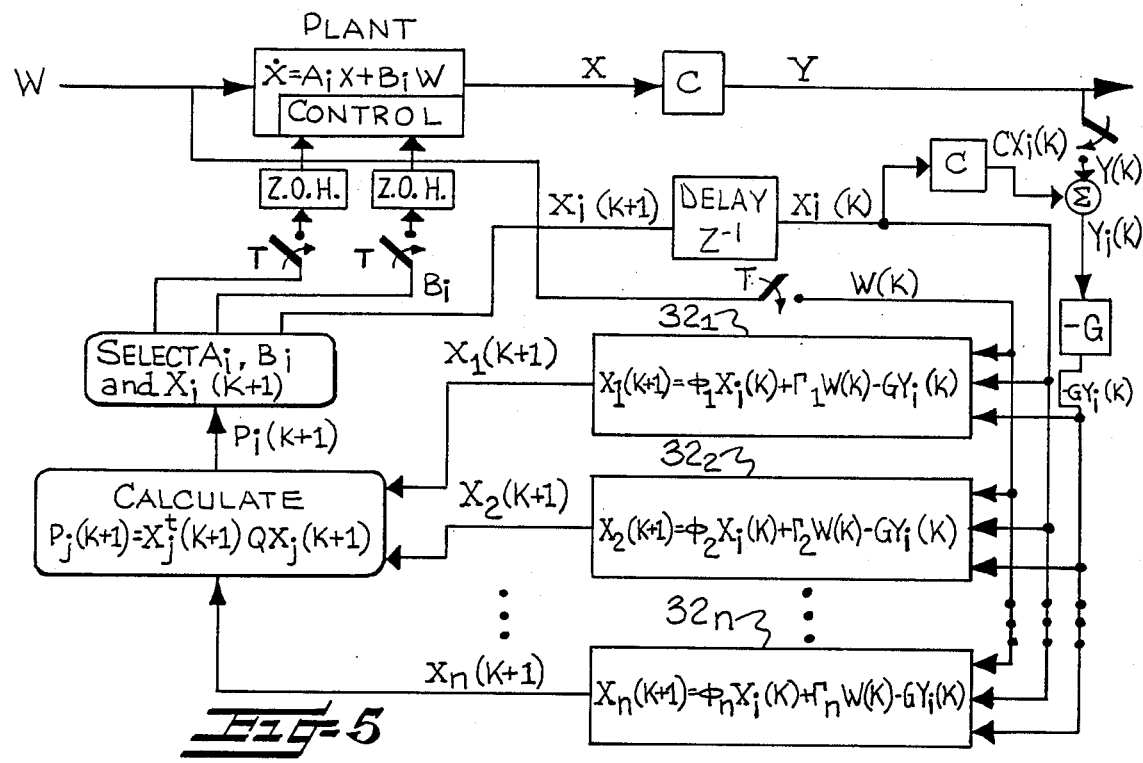
FIG. 5 is a block diagram of the control apparatus of the present invention wherein the disturbance input and a subset vector of the plant output are measured.

A more practical control apparatus is shown in FIG. 5. In this figure, the plant output states X are passed through the output matrix C. The resulting output vector Y may be and usually is a subset of the output vector X. Only the outputs Y are measured. The output Y is sampled and produces Y(k). As in FIG. 4, the selected predicted or estimated state $X_i(k+1)$ is fed back through a delay $Z^{-1}$ to produce the estimated $X_i(k)$. These predicted states $X_i(k)$ are fed directly back into the observers $32_1, 32_2 \ldots 32_n$, which each have the form of equation (10).

$$X_j(k+1) = \phi_j X_i(k) + \Gamma_j W(k) - G Y_i(k) \qquad (10)$$

The state vector $X_i(k)$ is also passed through another output matrix C. The difference between the actual sampled output Y(k) and the predicted output $CX_i(k)$ is used to produce an error vector $Y_i(k)$. This error vector is passed through a gain matrix $-G$ to produce an error vector $-GY_i(k)$. This combination of vectors $X_i(k)$, W(k) and $Y_i(k)$ forms the observer as expressed in equation (10). The feedback of the output error $Y_i(k)$ improves the transient response and reduces the error between estimated observer output state $X_i(k)$ and the actual output state X(k). Note that if the output error $Y_i(k)$ is zero, equation (10) reduces to equation (9).

Figure 6:
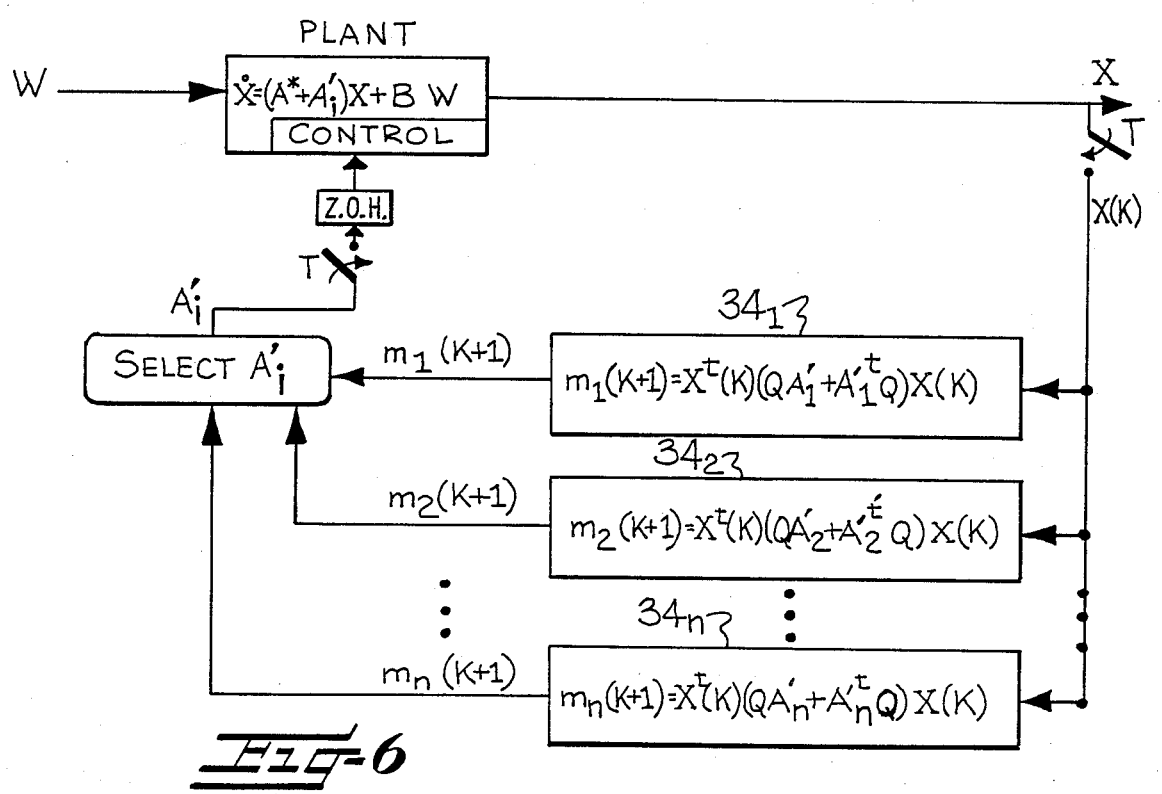
FIG. 6 is a block diagram of an alternative embodiment of the control apparatus of the present invention which measures the system output only.

Referring to FIG. 6, the illustrated control apparatus combines the cost function and observer means into a reduced form switching function means comprised of switching function generators $34_1, 34_2 \ldots 34_n$. The reduced form reduces the computational burden and eliminates the need to measure the input disturbances.

In general, as the semiactive dampers or similar control devices in the real system are caused to switch modes, the elements of A and B change. Assuming that the elements of B do not change, the elements of A which cannot be switched are denoted A* and the elements which can be switched are denoted $A'_j$. Thus, $$A_j = A^* + A'_j \qquad (11)$$

When equations (4), (5), (7) and (11) are substituted into equation (8), an expression for the predicted cost function $p_j(k+1)$ can be developed in terms of the present output states X(k) and the present disturbance inputs W(k). Further mathematical reduction is possible by eliminating all second order effects (eliminating terms with $T^2$). Lastly, terms which are common to all $p_j(k+1)$ are eliminated. These mathematical manipulations allow the development of a new state function $m_j(k+1)$.

$$m_j(k+1) = X^t(k)(QA'_j + A'^t_j Q)X(k) \quad (11)$$

The new function $m_j(k+1)$ is referred to as the switching function. $m_j(k+1)$ is similar to the cost function of equation (6) where the matrix $M_j$ is given by equation (13).

$$M_j = QA'_j + A'^t_j Q \quad (13)$$

Matrix $M_j$ is referred to as the switching weighting matrix. Thus, equation (12) can be rewritten as equation (14).

$$m_j(k+1) = X^t(k) M_j X(k) \quad (14)$$

Equation (14) has the same basic form as equation (8).

In a manner similar to the cost function of FIG. 3, the optimum, usually minimum, switching function $m_i(k+1)$ determines the most desirable system configuration (i.e., which dampers should be in a high damping or low damping mode).

In the system of FIG. 6, the input disturbance W is not measured. Also, note that since equations (12) and (14) are quadratic they only represent one scalar equation. Therefore, when compared to the control scheme of FIG. 3, the computational burden has been reduced. Indeed, all or part of the algorithm may be hard wired with analog and discrete logic components. Also, since the switching weighting matrices $M_j$ do not depend on time they may be preprocessed.

Figure 7:
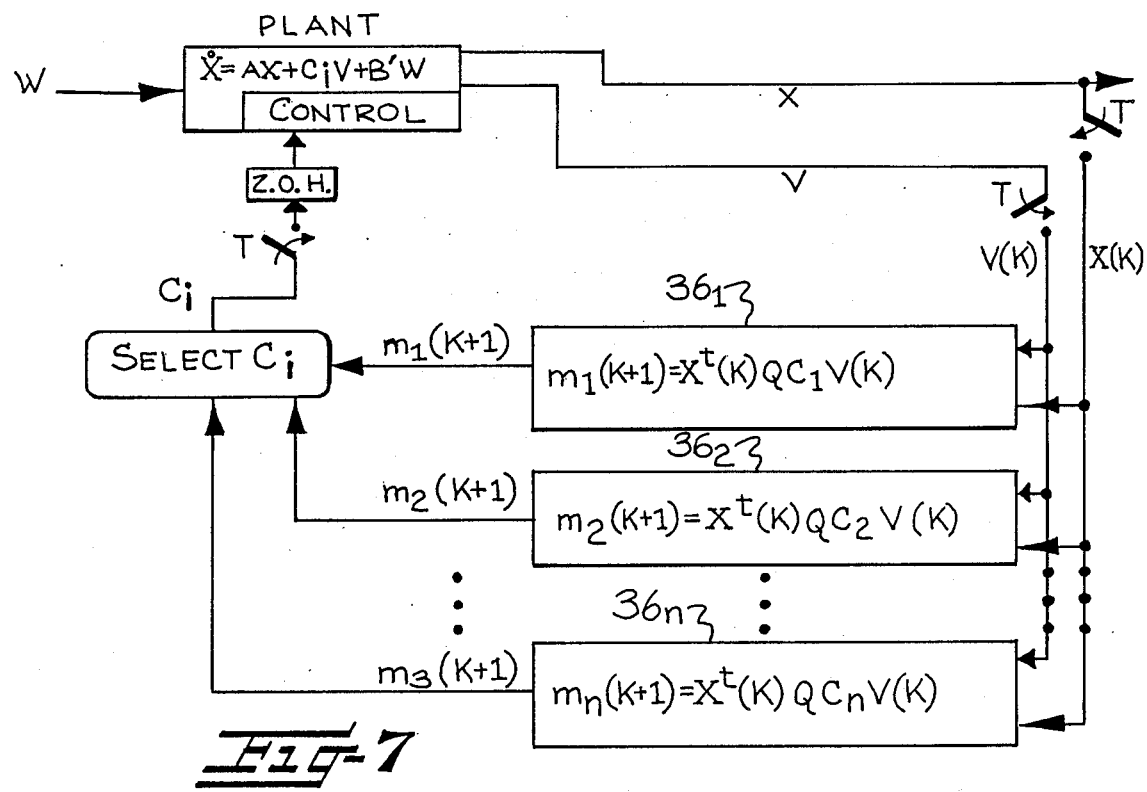
FIG. 7 is a block diagram of another alternative embodiment of the control apparatus of the present invention which measures the plant output only.

FIG. 7 illustrates another alternate embodiment of apparatus for controlling a system having semiactive dampers. The development of equations (12), (13), and (14) depended on the assumption that matrix B did not contain switchable elements. An example of a system which contains switchable elements in the B matrix is the simple single degree-of-freedom model of FIG. 2. The alternate control apparatus of FIG. 7 can handle switchable elements in the B matrix. This alternate apparatus is based on the fact that the semiactive damper system only switches the damper modes. Specifically, suppose that n hi/lo mode dampers have relative velocities which are contained in a vector V which may be directly measured (as shown) or derived from the plant output X. Using this information a new output state representation with one state can be developed as shown in equation (15).

$$\dot{X} = AX + C_j V + BW \quad (15)$$

For any mechanical system, the switchable elements are represented in matrix $C_j$. In equation (15), A and B do not contain switchable elements.

In the way that equation (10) was developed, an alternative form of the switching function means $36_1, 36_2 \ldots 36_n$ of FIG. 7 can be developed as given by equation (16).

$$m_j(k+1) = X^t(k) Q C_j V(k) \quad (16)$$

In equation (16), the $X^t(k)QC_j$ has a form similar to linear state variable feedback. As before, the optimum $m_j(k+1)$ determines the system configuration. The importance of equation (16) is that it can handle switchable elements in both the A and the B matrices.

Figure 8:
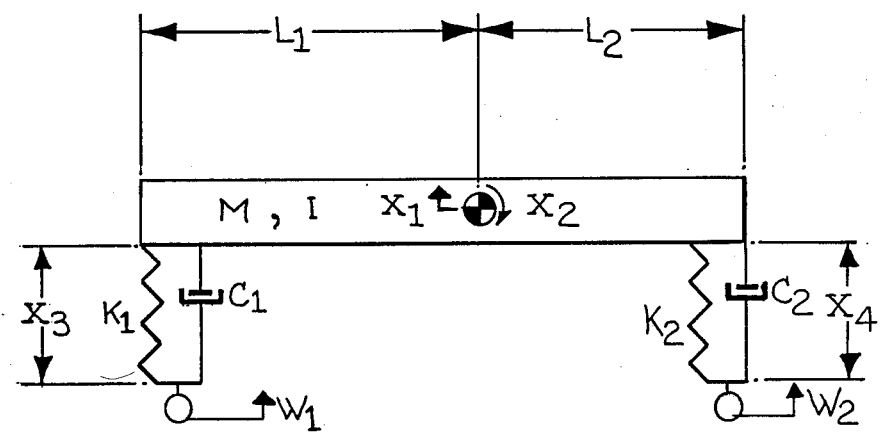
FIG. 8 is a schematic representation of a suspension system of a motorcycle.

FIG. 8 is a schematic representation of a motorcycle suspension system. The system has mass M and moment of inertia I. The suspension has two semiactive dampers, $C_1$ and $C_2$, in parallel with springs $K_1$ and $K_2$, respectively. Lengths $L_1$ and $L_2$ locate the center of gravity of mass M. The output states are $X_1$, $X_2$, $X_3$ and $X_4$ which are the heave velocity of the center of gravity, angular velocity, deflection of spring $K_1$, and deflection of spring $K_2$, respectively. The disturbance inputs are $W_1$ and $W_2$. This model has switchable elements in the B matrix, therefore the switching function uses the form of equation (16) instead of equation (12). For this example, the $C_j$ matrix can be found to be equation (17).

$$C_j = \begin{bmatrix} a_j & b_j \\ c_j & d_j \\ 0 & 0 \\ 0 & 0 \end{bmatrix} \quad (17)$$

The elements of this matrix are defined in FIG. 9 for the four different damping mode combinations.

When equation (15) is evaluated, it results in the scalar form of the switching function.

$$m_j(k+1) = (G_{1j}X_1 + G_{2j}X_2 + G_{3j}X_3 + G_{4j}X_4)V_1 + (G_{5j}X_1 + G_{6j}X_2 + G_{7j}X_3 + G_{8j}X_4)V_2 \quad (18)$$

The gains in equation (18) are defined in equations (19).

$$\begin{aligned}
G_{1j} &= a_j q_1 + c_j q_2 & G_{5j} &= c_j q_1 + d_j q_2 \\
G_{2j} &= a_j q_2 + c_j q_5 & G_{6j} &= c_j q_2 + d_j q_5 \\
G_{3j} &= a_j q_3 + c_j q_6 & G_{7j} &= c_j q_3 + d_j q_6 \\
G_{4j} &= a_j q_4 + c_j q_7 & G_{8j} &= c_j q_4 + d_j q_7
\end{aligned} \quad (19)$$

Figure 10:
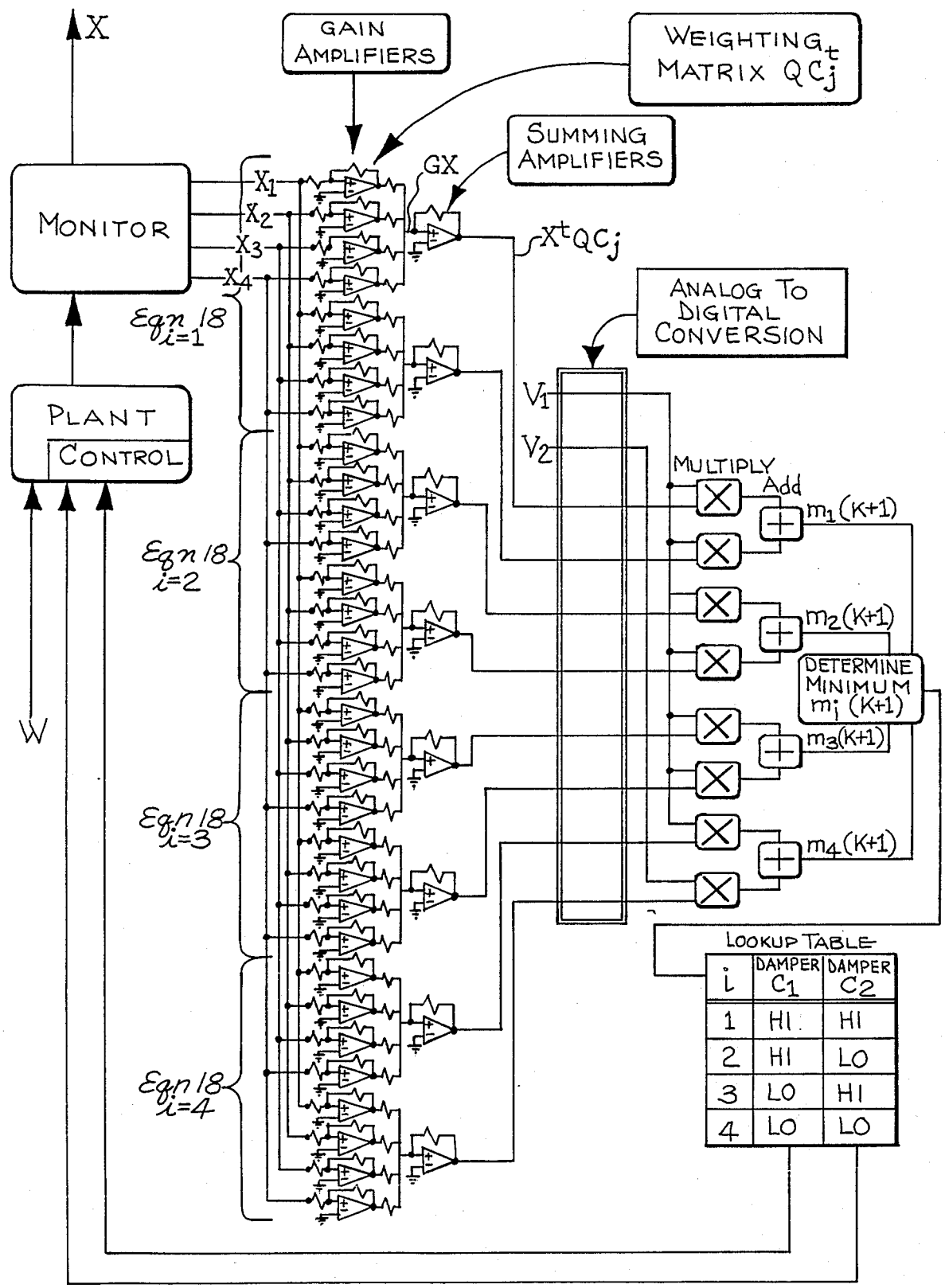
FIG. 10 is a schematic diagram of a control apparatus according to the present invention that is compatible with the schematic diagram of FIG. 8.

As mentioned earlier, the control calculations and procedures can be implemented with analog circuitry, a digital computer or a hybrid analog/digital computer. A schematic of a hybrid controller is shown in FIG. 10. The plant output X is monitored, as represented by signals $X_1$, $X_2$, $X_3$ and $X_4$. These four signals are provided to the gain amplifiers as represented by equation (18). The gain and summing operational amplifiers are used together to execute the state feedback portion $X^t(k)QC_j$ of equation (16). The outputs of the summing operational amplifiers is then converted to the digital domain. In the computer, each $X^t(k)QC_j$ is multiplied by either relative velocity signal $V_1$ or $V_2$, thus producing the switching functions. Next, the digital computer selects the minimum switching function $m_i(k+1)$. The index $i$ of the minimum switching function is used with the lookup table to select the appropriate damper mode setting signals. The damper setting signals cause the dampers (plant controls) to assume the desired mode.

The digital computer can be used to establish and adjust the gains of the operational amplifiers based on the selected weighting matrix Q. For this example, equations (19) would be used to calculate the appropriate gains. The weighting in matrix Q can be changed manually or by an adaptive algorithm. Since the weighting matrix was selected to be fully populated, the hybrid computer of this example has the most general form. If the weighting matrix is sparsely populated, the hybrid computer will take a simpler form. In this case, some of the states may not have to be measured.

FIG. 11 is a block diagram of a semiactive damper observer control apparatus that responds to a number of external commands, adaptive algorithms, or other external signals. This apparatus contains the parallel set of observers and the cost function means of FIG. 2, which represent the primary feedback and feed-forward loops of observer control apparatus for semiactive damper systems. A secondary feedback loop is established used through an adaptive controller. This adaptive controller may be programmed with several finite impulse response (FIR) filters. Examples of a FIR filter are a running average or running RMS calculation of the inputs and outputs over a fixed interval of time. In either case, the FIR filter may adjust the parameters of the cost function means or the observers based on the results of the output of the FIR filter. For example, in terms of the control of a vehicle, if the RMS levels of the input disturbances become extremely large over a period of 10 seconds, the cost function may be changed to minimize states which affect ride. Such action would probably simultaneously degrade handling. On the other hand, if lateral accelerations are experienced over a period of 10 seconds, the adaptive controller may adjust the cost functions to improve handling at the expense of good ride characteristics. FIR filters may also be designed to impose safety constraints when needed.

Direct external commands to the semiactive observer controller are also possible as shown in the lower portion of FIG. 11. These inputs may originate from the speedometer, brakes, steering mechanism, tachometer, diagnostics, etc., and may adjust the weighting matrices of the cost function or directly modify the observer matrices. For example, if a feedback sensor in the plant system was diagnosed as faulty, there may be enough redundancy in the observability of the control apparatus to use the observers to predict the signal from the particular faulty sensor. One of the most important features of the control apparatus, indicated by the "manual" input shown in FIG. 11, is that an operator can directly adjust the weighting of the cost function.

In the drawings and specification there have been set forth exemplary and alternate embodiments of the invention. While specific terms are employed they are used in a generic and descriptive sense only and not for purposes of limitation.

I claim:

1. Apparatus for controlling operation of a suspension system having semiactive damper means, said damper means being adjustable to permit operation thereof in different modes of operation, adjustments of said damper means causing said damper means to operate in different ones of said modes of operation and thereby causing said suspension system to operate in different modes, the damping provided by said damper means in each of said modes of operation of said system being different from the damping produced by said damper means in other of said modes of operation of said system, said system receiving disturbance input and producing output, said apparatus comprising:

monitoring means for monitoring conditions of operation of said suspension system and for producing data indicative thereof;

system modeling observer means for modeling said different modes of said system, and for receiving data from said monitoring means, and for generating real time estimates of the output that would be produced by said system in each of said modes thereof modeled by said observer means;

function means for comparing said estimates generated by said means with each other and for identifying an optimum one of said estimates;

and control means for causing said damper means to operate in said system in the one of said modes thereof corresponding to the one of said modes thereof in the one of said modeled system modes producing said optimum one of said estimates.

2. Apparatus as in claim 1, wherein said damper means includes a plurality of semiactive dampers.

3. Apparatus as in claim 2, wherein each of said dampers is adjustable in a manner causing change in the damping coefficient thereof.

4. Apparatus as in claim 3, wherein each of said dampers includes a piston and cylinder assembly having a piston and a cylinder, said cylinder containing hydraulic fluid flowing between opposite end portions of said cylinder in response to relative movement across said assembly, and adjustable valve means for regulating said fluid flow and thereby regulating the damping coefficient of the damper.

5. Apparatus as in claim 3, wherein said observer means includes a plurality of parallel observers each modeling a different one of said modes of said system.

6. Apparatus as in claim 1, wherein said conditions monitored by said monitoring means include at least one from a group consisting of system input and system output.

7. Apparatus as in claim 1, wherein said conditions monitored by said monitoring means includes at least one system input condition and at least one system output condition.

8. Apparatus as in claim 1, wherein said conditions monitored by said monitoring means all relate to said disturbance input into said system.

9. Apparatus as in claim 1, wherein said observer means generates said estimates repetitiously at preselected time intervals.

10. Apparatus as in claim 1 wherein said function means includes weighting means for imparting different weights to parameters assessed by said function means in identifying said optimum one of said estimates.

11. Apparatus as in claim 10, including means for automatically varying the weight imparted to at least one of said parameters in response to said data produced by said monitoring means.

12. Apparatus as in claim 11, including means for permitting manual adjustment by an operator of the weight imparted to at least one of said parameters.

13. Apparatus for controlling operation of a system receiving disturbance input and producing output, said system including adjustable means the adjustment of which changes the operating modes of said adjustable means and of said system, said adjustable means including a plurality of independently adjustable devices, said apparatus comprising:

monitoring means for monitoring conditions of operation of said system and for producing data indicative of said conditions of operation of said system;

a plurality of parallel system modeling observers for modeling respective ones of said operating modes of said system, for receiving data from said monitoring means, and for generating estimates of the output that would be produced by said system in each of said modes thereof modeled by said observers;

function means for comparing said estimates generated by said observers with each other and for identifying an optimum one of said estimates;

and control means for causing said adjustable means to operate in said system in the one of said modes thereof corresponding to the one of said modes thereof in the one of said modeled system modes producing said optimum estimate.

14. Apparatus as in claim 13, wherein said conditions monitored by said monitoring means are from the group consisting of input to said system and output from said system.

15. Apparatus as in claim 13, wherein said conditions monitored by said system are conditions of said disturbance input to said system.

16. Apparatus as in claim 13, said conditions monitored by said monitoring means are conditions of said output of said system.

17. Apparatus as in claim 13, wherein said function means includes weighting means for imparting different weights to parameters assessed by said function means in identifying said optimum one of said estimates.

18. Apparatus as in claim 17, wherein said weighting means includes means for automatically imparting different weights to different ones of said parameters in response to a sensed condition of said system.

19. Apparatus as in claim 18, wherein said weighting means includes means for permitting manual operator adjustment of the weights imparted to said parameters.

20. Apparatus as in claim 19, wherein said system has N of said adjustable devices each capable of M different modes, and the number of said observers is $M^N$.

21. Apparatus for controlling operation of a suspension system receiving disturbance input and producing output, said system including adjustable semiactive damper means, adjustments of said damper means causing said damper means to operate in different adjustive modes thereof and thereby causing said system to operate in different system modes, said apparatus comprising:

monitoring means for monitoring conditions of operation of said system and for producing data indicative thereof;

function means for modeling different ones of said modes of said system, for receiving output from said monitoring means and for generating functions indicative of the value of the output that would be produced by said system in each of said different modeled modes thereof;

and controller means for identifying the optimum one of said functions and for causing said damper means to operate in the one of said modes thereof corresponding to the one of said modes thereof in the one of said modeled system modes producing said optimum one of said functions.

22. Apparatus as in claim 21, wherein said function means is comprised of a plurality of function generators each generating a switching function representative of the estimated value of the output of said system in a different one of said modeled modes thereof.

23. Apparatus as in claim 22, wherein said damper means includes N semiactive dampers each capable of M different modes, and wherein said function means includes $M^N$ of said function generators.

* * * * *